(12) United States Patent
Steele et al.

(10) Patent No.: US 7,880,589 B2
(45) Date of Patent: Feb. 1, 2011

(54) COMMUNICATIONS DEVICE IDENTIFICATION METHODS, COMMUNICATIONS METHODS, WIRELESS COMMUNICATIONS READERS, WIRELESS COMMUNICATIONS SYSTEMS, AND ARTICLES OF MANUFACTURE

(75) Inventors: Kerry D. Steele, Kennewick, WA (US); Gordon A. Anderson, Benton City, WA (US); Ronald W. Gilbert, Morgan Hill, CA (US)

(73) Assignee: Battelle Memorial Institute, Richland, WA (US)

( * ) Notice: Subject to any disclaimer, the term of this patent is extended or adjusted under 35 U.S.C. 154(b) by 1553 days.

(21) Appl. No.: 10/774,146

(22) Filed: Feb. 6, 2004

(65) Prior Publication Data

US 2005/0176414 A1 Aug. 11, 2005

(51) Int. Cl.
*H04Q 5/22* (2006.01)

(52) U.S. Cl. .................. 340/10.32; 340/3.52; 340/3.6; 340/10.1; 340/10.33; 340/573.1; 455/39; 455/41.2; 455/434; 455/550.1

(58) Field of Classification Search .............. 455/404.2, 455/414.2, 456.1, 9, 41.2, 41.3, 39, 414.1, 455/434, 550.1; 340/10.2, 10.3, 10.31, 10.32, 340/10.33, 10.34, 10.4, 10.41, 10.42, 825.31, 340/5.92, 572.1, 3.51, 3.52, 3.53, 3.5, 3.54, 340/10.1, 825.54, 3.1, 5.1, 3.6, 539.23, 540, 340/572.4, 573.1; 235/385
See application file for complete search history.

(56) References Cited

U.S. PATENT DOCUMENTS

| | | | |
|---|---|---|---|
| 5,856,788 A * | 1/1999 | Walter et al. ................ 340/10.2 |
| 5,874,724 A * | 2/1999 | Cato .......................... 235/492 |
| 6,061,344 A * | 5/2000 | Wood, Jr. .................... 370/346 |
| 6,286,762 B1 | 9/2001 | Reynolds et al. |
| 6,317,027 B1 | 11/2001 | Watkins |
| 6,354,493 B1 | 3/2002 | Mon |
| 6,491,217 B2 | 12/2002 | Catan |
| 6,529,880 B1 | 3/2003 | McKeen et al. |
| 6,616,047 B2 | 9/2003 | Catan |
| 6,725,014 B1 * | 4/2004 | Voegele ...................... 455/41.2 |
| 6,727,803 B2 * | 4/2004 | Hulvey ..................... 340/10.31 |
| 6,876,294 B1 * | 4/2005 | Regan ...................... 340/10.32 |
| 6,927,692 B1 * | 8/2005 | Petrinovic ................ 340/572.1 |
| 6,958,678 B2 * | 10/2005 | Hohberger et al. ......... 340/10.1 |
| 7,009,518 B2 * | 3/2006 | Liao et al. ................. 340/572.1 |
| 7,075,436 B2 * | 7/2006 | Shanks et al. ............. 340/572.1 |
| 7,425,888 B2 * | 9/2008 | Powell ...................... 340/10.2 |
| 2002/0008140 A1 | 1/2002 | Reynolds et al. |
| 2002/0057208 A1 | 5/2002 | Lin et al. |
| 2002/0116372 A1 | 8/2002 | Ladouceur et al. |
| 2003/0007473 A1 | 1/2003 | Strong et al. |
| 2003/0132835 A1 | 7/2003 | Lin et al. |
| 2004/0046642 A1 * | 3/2004 | Becker et al. ............. 340/10.32 |
| 2005/0035849 A1 * | 2/2005 | Yizhack ..................... 340/5.92 |
| 2005/0068156 A1 * | 3/2005 | Chuang et al. ............. 340/10.2 |
| 2006/0017544 A1 * | 1/2006 | Tanaka et al. .............. 340/10.2 |

* cited by examiner

*Primary Examiner*—Olumide T Ajibade Akonai
(74) *Attorney, Agent, or Firm*—Wells St. John, P.S.

(57) ABSTRACT

Communications device identification methods, communications methods, wireless communications readers, wireless communications systems, and articles of manufacture are described. In one aspect, a communications device identification method includes providing identification information regarding a group of wireless identification devices within a wireless communications range of a reader, using the provided identification information, selecting one of a plurality of different search procedures for identifying unidentified ones of the wireless identification devices within the wireless communications range, and identifying at least some of the unidentified ones of the wireless identification devices using the selected one of the search procedures.

49 Claims, 4 Drawing Sheets

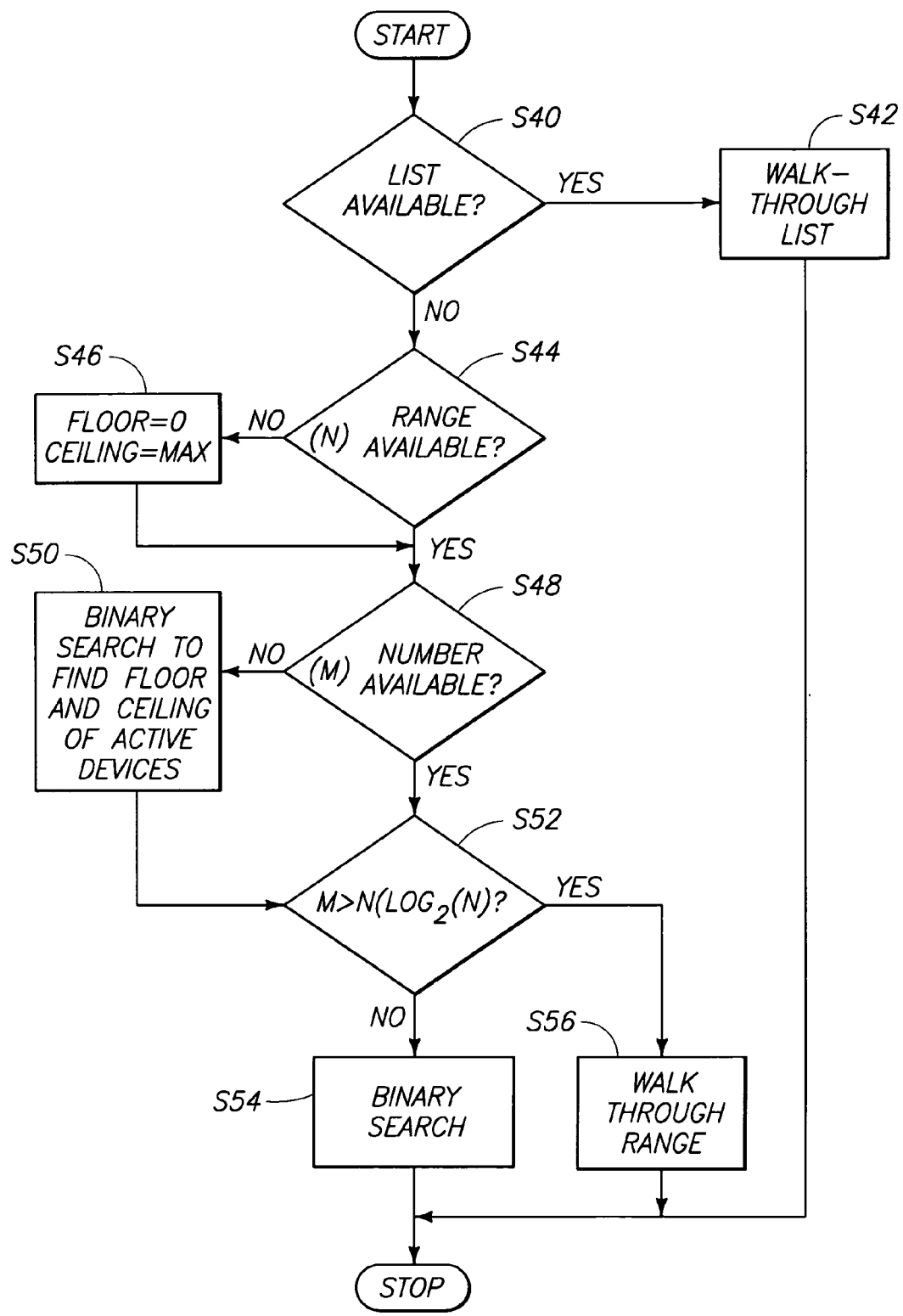

US 7,880,589 B2

COMMUNICATIONS DEVICE IDENTIFICATION METHODS, COMMUNICATIONS METHODS, WIRELESS COMMUNICATIONS READERS, WIRELESS COMMUNICATIONS SYSTEMS, AND ARTICLES OF MANUFACTURE

GOVERNMENT RIGHTS STATEMENT

This invention was made with Government support under Contract DE-AC0676RLO1830 awarded by the U.S. Department of Energy. The Government has certain rights in the invention.

TECHNICAL FIELD

This invention relates to communications device identification methods, communications methods, wireless communications readers, wireless communications systems, and articles of manufacture.

BACKGROUND OF THE INVENTION

Remote wireless communications may be implemented using radio frequency (RF) technology. Exemplary applications utilizing RF technology include identification applications including, for example, locating, identifying, and tracking of objects. Radio frequency identification device (RFID) systems may be utilized to facilitate identification operations. For example, one device may be arranged to output and receive radio frequency communications and one or more remotely located device may be configured to communicate with the one device using radio frequency communications. The remotely located device(s) may be referred to as a tag, while the other device may be referred to as a reader. Some advantages of radio frequency communications of exemplary radio frequency identification device systems include an ability to communicate without contact or line-of-sight, at relatively fast speeds, and with robust communication channels.

During some communication implementations, it may be desired to have information regarding the presence of one or more remote device within a communications system. For example, it may be desired to identify tags present at a given moment in time within a communications range of a reader. Some configurations are dynamic wherein a set of present communications devices may change from one moment in time to another. One method may use search algorithms based on tags generating pseudo-random numbers and wherein the tags respond to broadcast messages utilizing transmission delays based upon the random numbers. At least some aspects of the disclosure include methodologies and structural arrangements for identifying communications devices of a wireless communications system.

BRIEF DESCRIPTION OF THE DRAWINGS

Preferred embodiments of the invention are described below with reference to the following accompanying drawings.

FIG. 5 is a flow chart of a first exemplary procedure for selecting one of a plurality of search procedures according to one embodiment.

DETAILED DESCRIPTION OF THE PREFERRED EMBODIMENTS

Figure 1:
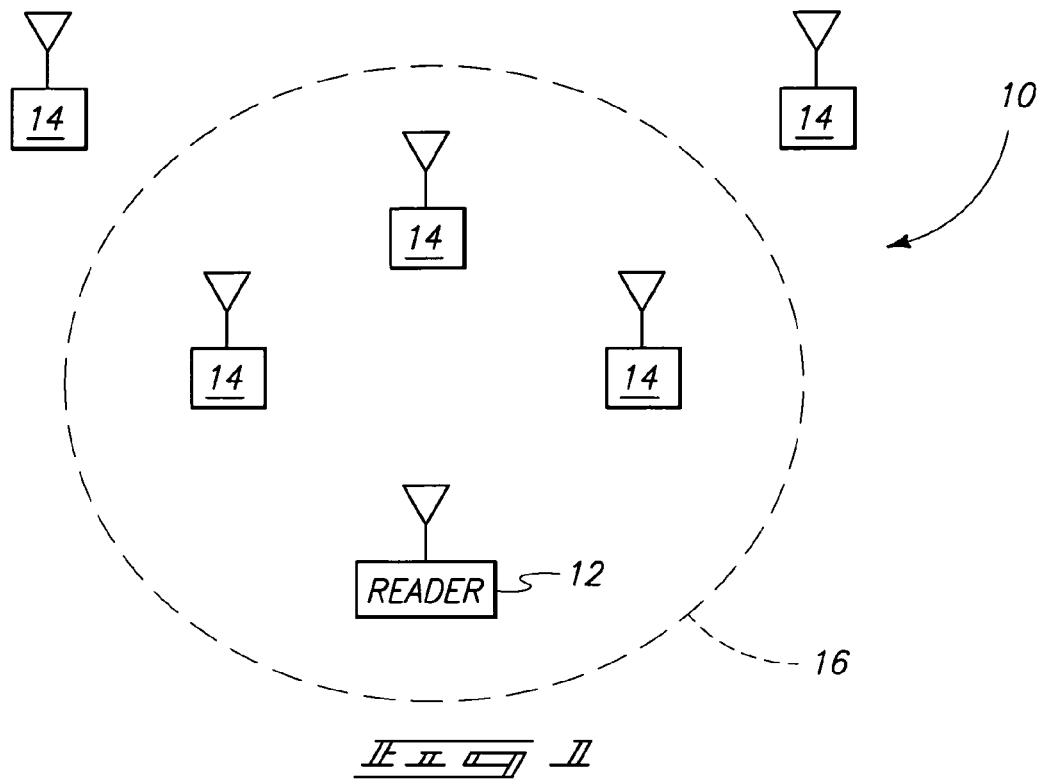
FIG. 1 is an illustrative representation of a wireless communications system according to one embodiment.

According to one aspect, a communications device identification method comprises providing identification information regarding a group of wireless identification devices within a wireless communications range of a reader, using the provided identification information, selecting one of a plurality of different search procedures for identifying unidentified ones of the wireless identification devices within the wireless communications range, and identifying at least some of the unidentified ones of the wireless identification devices using the selected one of the search procedures.

According to another aspect, a communications device identification method comprises providing a reader configured to communicate with a plurality of wireless identification devices, identifying a first of the wireless identification devices within a wireless communications range of the reader, identifying a second of the wireless identification devices within the wireless communications range of the reader, selecting one of a plurality of different search procedures responsive to the identifyings, and identifying at least one unidentified wireless identification device within the wireless communications range using the selected one of the search procedures.

According to yet another aspect, a communications device identification method comprises providing information regarding a range of identifiers of wireless communications devices which may be within a wireless communications range of a reader, providing information regarding a number of wireless communications devices which may be within the wireless communications range, selecting a binary search procedure if $M<N/LOG_2(N)$, wherein M is the range of the identifiers of the wireless communications devices and N is the number of wireless communications devices, and selecting a walk-through search procedure if $M>N/LOG_2(N)$.

According to an additional aspect, a communications method comprises providing a first group of wireless identification devices within a wireless communications range of a reader at a first moment in time, providing first identification information regarding the first group, first selecting one of a plurality of different search procedures for identifying the wireless identification devices of the first group, wherein the first selecting comprises selecting using the first identification information, identifying unidentified ones of the wireless identification devices of the first group using the selected one of the search procedures, providing a second group of wireless identification devices within the wireless communications range of the reader at a second moment in time, providing second identification information regarding the second group, second selecting an other of the different search procedures using the second identification information, and identifying unidentified ones of the wireless identification devices of the second group using the selected other of the search procedures.

According to still another aspect, a wireless communications reader comprises an antenna configured to communicate wireless signals within a wireless communications range and processing circuitry coupled with the antenna and configured to implement wireless communications with a plurality of wireless identification devices within the wireless communications range via the antenna, to analyze a number of wireless identification devices which may be present within the wireless communications range with respect to a range of identifiers of wireless identification devices which may be present within the communications range, to select one of a plurality of search procedures responsive to the analysis, and to identify at least one of the wireless identification devices within the wireless communications range using the selected search procedure.

According to yet another aspect, a wireless communications system comprises a wireless communications reader configured to implement wireless communications within a wireless communications range, a first group of wireless identification devices located within the wireless communications range at a first moment in time, a second group of wireless identification devices located within the wireless communications range at a second moment in time, wherein the wireless communications reader is configured to obtain the identity of at least one of the wireless identification devices of the first group using a first search procedure and to obtain the identity of at least one of the wireless identification devices of the second group using a second search procedure different than the first search procedure, and wherein the wireless communications reader is configured to select the first and the second search procedures responsive to an analysis of group identification information of respective ones of the first group and the second group.

According to still another additional aspect, an article of manufacture comprises a medium comprising executable instructions configured to cause processing circuitry of a wireless communications reader to access information regarding a plurality of wireless identification devices which may be within a communications range of the wireless communications reader, select one of a plurality of different search procedures using the accessed information, wherein the different search procedures comprise procedures for identifying unidentified ones of the wireless identification devices, and identify unidentified ones of the wireless identification devices using the selected one of the search procedures.

Referring to FIG. 1, an exemplary wireless communications system 10 according to one embodiment is shown. In the depicted arrangement, the system 10 includes a plurality of wireless communications devices configured to implement wireless communications. Exemplary wireless communications devices include a reader 12 and a plurality of remote communications devices 14. Reader 12 embodied as a wireless communications device in one embodiment has an associated wireless communications range 16 wherein communications between reader 12 and devices 14 are possible. In the illustrated embodiment, reader 12 may communicate with devices 14 located within range 16 while devices 14 outside of range 16 are considered outside the communications capabilities of reader 12. In at least one implementation, devices 14 may be individually and dynamically moved including moved in and out of wireless communications range 16 (e.g., in an inventory application).

In one exemplary embodiment, the wireless communications devices of system 10 are configured to communicate using radio frequency communications. In one arrangement of system 10, the wireless communications devices are configured to implement identification functionality. For example, remote communications devices 14 may be configured to communicate unique identification information associated with the respective devices 14. In one embodiment, system 10 may be arranged for radio frequency identification device (RFID) communications and remote communications devices 14 may be embodied as tags. Reader 12 may output an interrogation signal and remote communications devices 14 may operate as transponders to reply to the interrogation signal by communicating respective wireless signals comprising identification information (e.g., unique numbers associated with the individual communicating devices 14) in one transponder operational embodiment. Devices 14 may be implemented as active or passive devices and may utilize backscatter modulation of RF energy in some embodiments to communicate to reader 12. Devices 14 communicating identification information may be referred to as wireless identification devices. Other identification operations or methods are possible.

Figure 2:
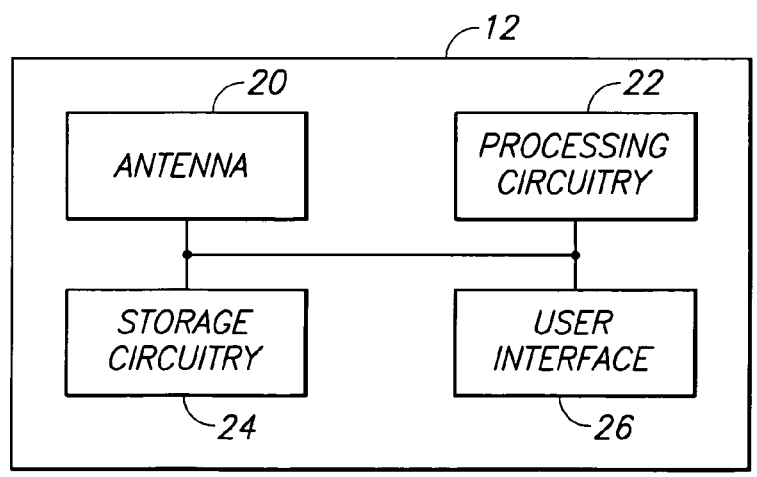
FIG. 2 is a functional block diagram of a wireless communications device according to one embodiment.

Referring to FIG. 2, an exemplary configuration of a reader 12 is depicted. Reader 12 includes one or more antenna 20, processing circuitry 22, storage circuitry 24, and a user interface 26 in the illustrative embodiment. Other arrangements are possible including more, less or alternate components.

Antenna 20 is configured to provide bi-directional communications of reader 12 with respect to one or more remote communications device 14. In another embodiment, plural antennae 20 individually corresponding to one of transmit or receive operations may be provided. In an exemplary configuration, antenna 20 is configured to implement microwave communications of approximately 915 MHz, 2.45 GHz, or other appropriate frequency.

Processing circuitry 22 is configured to implement wireless communications with respect to remote communications devices 14. For example, processing circuitry 22 may formulate interrogation signals outputted from reader 12 to devices 14 as well as process communications received from devices 14. In one embodiment, processing circuitry 22 may also control identification operations of reader 12 for identifying devices 14 present within communications range 16 at a given moment in time. As described further below, reader 12 is arranged to select one of a plurality of different search procedures and to perform the selected search procedure to identify devices 14 within range 16 in one embodiment.

Processing circuitry 22 may comprise circuitry configured to implement desired programming in one embodiment. For example, the processing circuitry 22 may be implemented as a processor or other structure configured to execute executable instructions including, for example, software and/or firmware instructions. Other exemplary embodiments of processing circuitry include hardware logic, PGA, FPGA, ASIC, state machines, and/or other structures. These examples of processing circuitry 22 are for illustration and other configurations are possible.

Storage circuitry 24 is configured to store electronic data and/or programming such as executable instructions (e.g., software and/or firmware), data, or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

User interface 26 may include a user access device configured to receive user input and embodied, for example, as a keyboard, mouse, etc., and a display device configured to depict information and embodied, for example, as a graphical user interface. Other configurations are possible.

A plurality of remote communications devices 14 configured to communicate with reader 12 may be defined as a group. A group may refer to a set of commonly associated remote communications devices 14 in one arrangement. In one embodiment, devices 14 of a common group may have unique identification numbers which are part of a common identification scheme for the specific group and may identify the group in general as well as respective individual devices 14 of the group. Devices 14 of a plurality of different groups may be present within communications range 16 at the same or different moments in time.

At some moments in time, some, all or none of devices 14 of a given group may be within communications range 16. Devices 14 of a given group may be referred to as possible devices 14 which may be within communications range 16 at a given moment in time. Devices 14 located within communications range 16 may be referred to as active or present devices 14.

Reader 12 may address commands for processing by a selected subset of devices 14 of a given group. For example, assume one group has one thousand devices uniquely identified by respective identifiers within an identification range of 1-1000 (e.g., a second different group of devices 14 may be assigned identifiers within a range of 1001-2000). Reader 12 may forward a command requesting a reply and addressed to a subset of the group by specifying a desired subset range corresponding to the subset (e.g., the desired subset range may include devices 14 having associated unique identifiers between minimum and a maximum identifiers, for example, between 50-100). Devices 14 within the appropriate subset range who receive the command may reply to reader 12 responsive to processing the command, while devices 14 outside of the subset range may disregard the command even if received and processed thereby.

In some embodiments, it is desired to identify the presence of one, some or all wireless communications devices 14 of a group within communications range 16 of reader 12. In one embodiment, group identification information is used by reader 12 to identify the devices 14. As described below in one specific embodiment, group identification information may be utilized by processing circuitry 22 to select one of a plurality of different search procedures. Processing circuitry 22 may use the selected search procedure to identify active devices 14 of the group within communications range 16.

Group identification information may be provided regarding individual groups of remote communications devices 14. Examples of group identification information may include a range of identification numbers of possible devices 14 which may be within range 16 and/or the total number of possible devices 14 which may be within range 16. Group identification information may be provided to reader 12 (e.g., apriori—before communications of reader 12 with devices 14) and/or determined by reader 12. As mentioned above, group identification information may be utilized to identify active devices 14 present within communications range 16 in one embodiment. In one example, group identification information is used to select one of a plurality of search procedures which is used for identifying individual active devices 14 present within communications range 16.

In the described embodiment, different search procedures for identifying the presence of devices 14 may be used. For example, one exemplary search procedure comprises a binary search procedure to identify devices 14 as discussed below with respect to FIG. 3. Another exemplary search procedure comprises a walk-through search procedure to identify devices 14 as discussed below with respect to FIG. 4. Other search procedures in addition to the procedures of FIGS. 3-4 may also be used. Aspects of the disclosure provide structure and methods for selecting one of the plurality of search procedures to be used for identification of devices 14. One exemplary method for selecting one of a plurality of different search procedures using group identification information is described with respect to FIG. 5. Other methods in addition to the exemplary methods of FIGS. 3-5 are possible.

Figure 3:
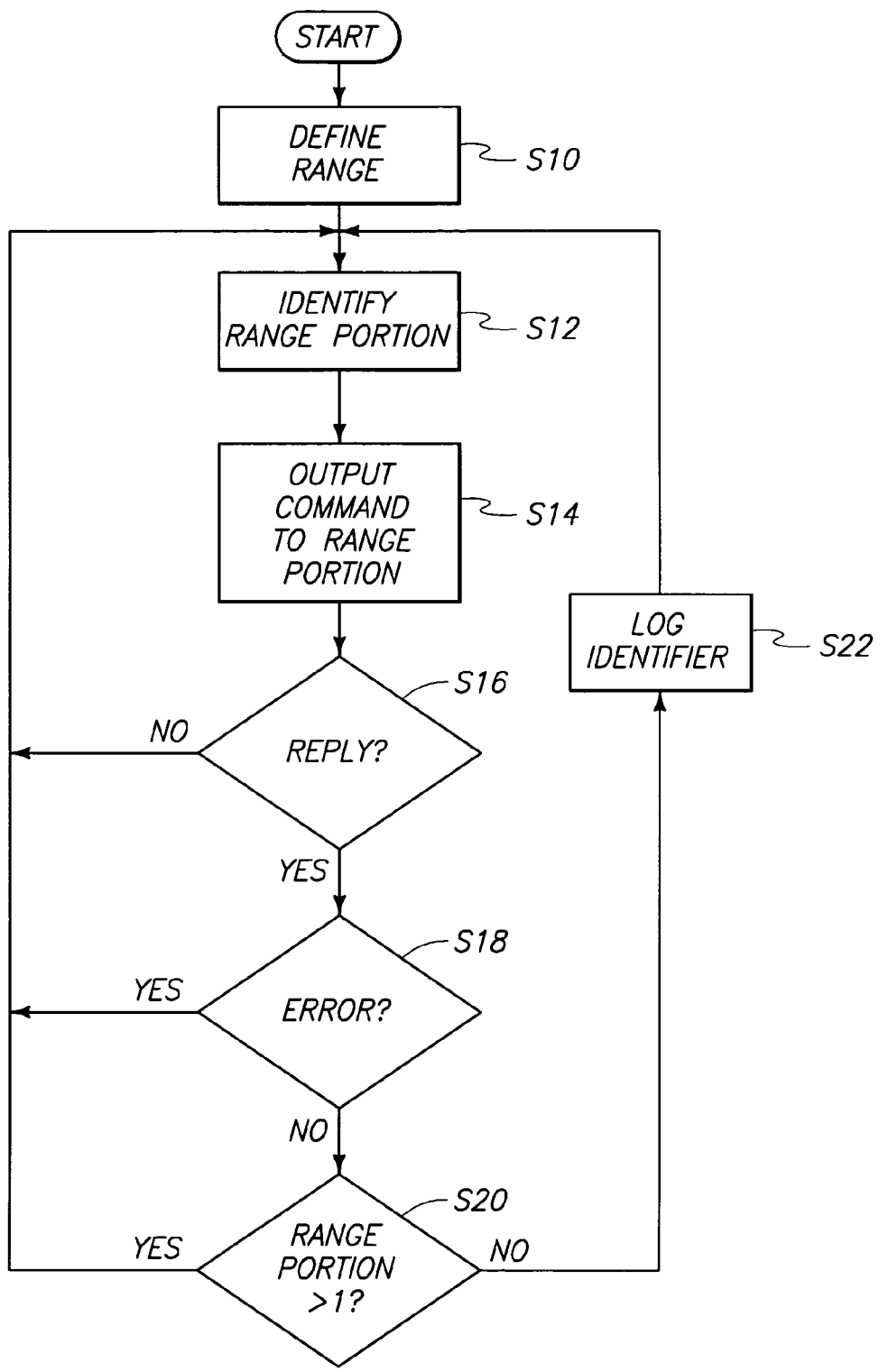
FIG. 3 is a flow chart of a first exemplary search procedure for identifying wireless communications devices according to one embodiment.
Figure 4:
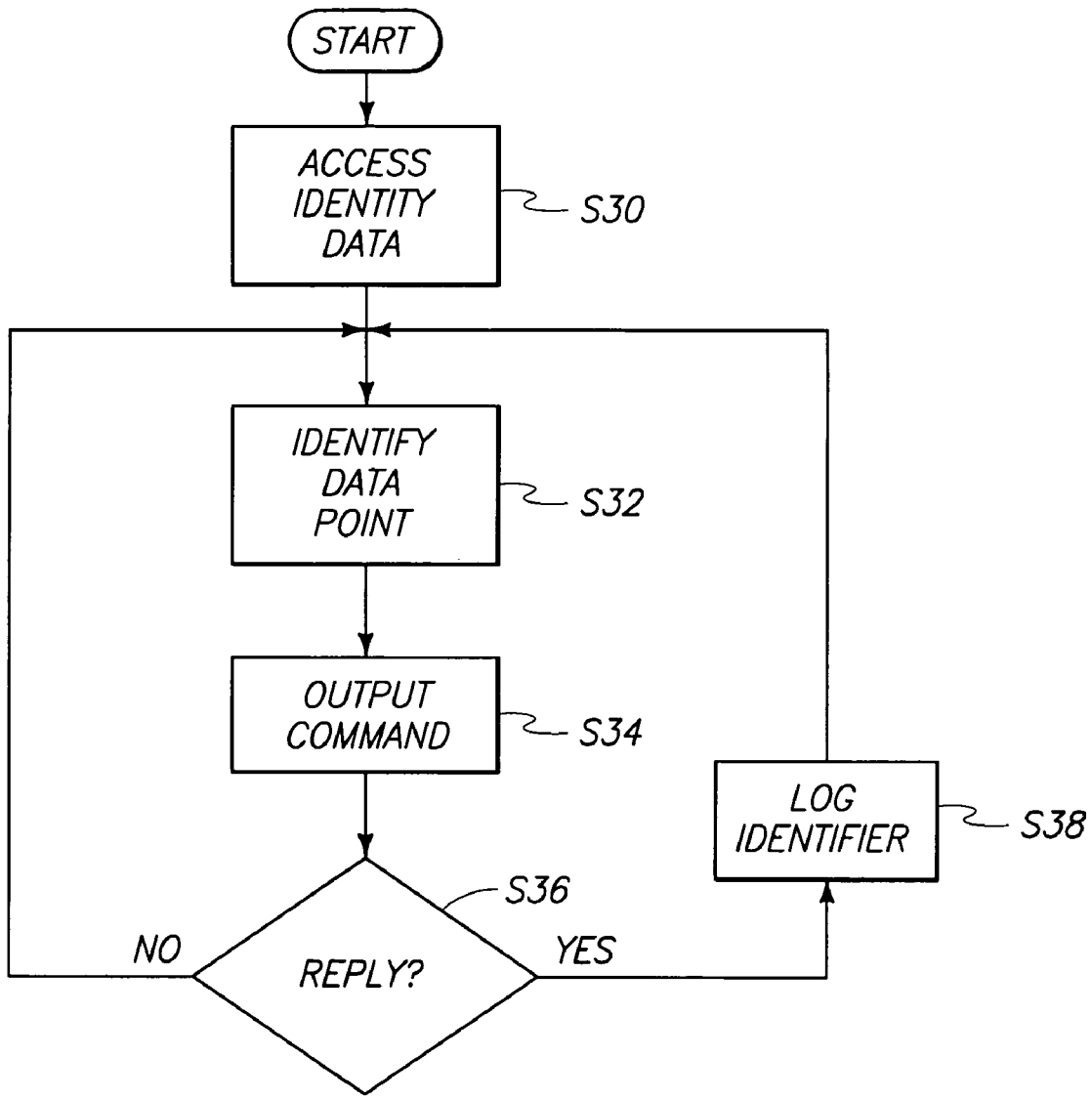
FIG. 4 is a flow chart of a second exemplary search procedure for identifying wireless communications devices according to one embodiment.

Referring to FIG. 3, an exemplary method of a binary search procedure for identifying active remote communications devices 14 within communications range 16 of reader 16 is shown. Processing circuitry 22 of reader 12 is configured to perform the illustrated method in one embodiment. The exemplary methodology provides recursive searching of different portions of a range to identify devices 14 within communications range 16. Other binary searching implementations are possible.

At a step S10, a range of remote communications devices to be searched is defined. In one example, assume the range is 1-10 devices.

At a step S12, a range portion is identified for performing an initial search. In an initial pass, a boundary at the middle of the range may be selected to define a lower range portion (devices 1-5) and an upper range portion (devices 6-10). Searching of one of the range portions commences to identify devices 14.

At a step S14, the reader outputs a command addressed to the devices 14 on one side of the boundary (e.g., the upper range portion) requesting that all recipient devices 14 of the command respond with their respective identifiers.

At a step S16, the reader monitors for the receipt of a reply.

If no replies are received, the method returns to step S12 and the reader may output a new command addressed to and requesting replies from devices 14 on the other side of the boundary corresponding to the other lower range portion and subsequently processed as described below. It may also be logged that the range portion just searched (i.e., the upper range portion) is devoid of active devices 14.

If a reply is received, the reader determines if an error is present at step S18. An error may result from a collision responsive to plural devices 14 responding simultaneously.

If an error is received, the process returns to step S12 to define a new range portion at step S12. For example, if the command returned an error when outputted to the upper range portion of devices 14, a new boundary splitting the upper range portion into halves may be defined and the process repeated wherein a new command is communicated to one of the two newly formed range portions.

If an error is not received, a single device is present (e.g., indicated by the absence of a collision) within the selected range portion. The process proceeds to step S20 to determine if the range portion (e.g., upper half in the described example) is >1.

If the range portion is larger than 1, the reader may return to step S12 to further split the range portion presently being searched for subsequent searching to specifically identify the single responding device.

If the range portion is not larger than 1, the reader may proceed to step S22 to log the identity of the found device 14.

Following the identification of a device 14, the reader may continue to search for additional devices 14. The reader may first search unsearched portions of the selected range portion (e.g., search previously split unsearched portions of the upper range portion) by selecting a new appropriate range portion in step S12.

If the initially selected range portion (e.g., upper half) has been completely searched, the process may proceed to search the lower range portion (e.g., devices 1-5) of the range by selecting the lower range portion at step S14 and repeating the illustrated method. The illustrated method may be repeated until all range portions have been searched in one embodiment. Further, other binary searching methods may be used in other embodiments.

The illustrated exemplary process may terminate by determining no range portions exist to be searched after step S22 in one embodiment.

Referring to FIG. 4, an exemplary method of a walk-through search procedure for identifying remote communications devices 14 within communications range 16 of reader 12 is shown. Processing circuitry 22 of reader 12 is configured to perform the illustrated method in one embodiment.

At a step S30, the list of possible remote communications devices 14 which may be present is accessed.

At a step S32, an appropriate device 14 to be searched is identified (e.g., first of the list during the initial pass).

At a step S34, the reader outputs a command requesting a reply and only addressed to the identified device.

At a step S36, the reader awaits a reply from the addressed device 14.

If no reply is received, the process returns to step S32 to identify another device 14 to be searched (e.g., the device 14 having the next highest identification number) and the process is repeated.

If a reply is received at step S36, the reader proceeds to step S38 to log the identifier for the respective device indicating its presence as an active device within communications range 16. Thereafter, the process returns to steps S32.

The illustrated method may be repeated until all devices 14 of the list have been searched in one embodiment. For example, in one embodiment, the process may terminate if no data points remain to be searched at step S32.

As mentioned above, at least some aspects of the disclosure provide selection of one of a plurality of different search procedures to identify devices 14 within communications range 16. FIG. 5 illustrates one exemplary methodology performed by processing circuitry 22 to select a binary search procedure of FIG. 3 or a walk-through search procedure of FIG. 4 for identifying devices 14 of a group at a given moment in time. Other search procedures may be selected and used in other arrangements. The process may be repeated at different moments in time to provide identification operations using respective different search procedures appropriate at the different moments in time. The illustrated methodology uses group identification information regarding at least some of the remote communication devices 14 to provide the selection in one embodiment.

Initially at step S40 of FIG. 5, the reader determines whether a list of devices 14 is available.

If affirmative, the process proceeds to a step S42 wherein the reader forwards individual commands configured to solicit responses from individual ones of the devices 14 upon the list similar to the method of FIG. 4. Responding devices 14 may be individually logged as active.

If step S40 is negative, the reader proceeds to a step S44 to determine if group identification information in the form of a range (N) of identifiers of possible devices 14 of a group to be searched and which may be within communications range 16 is known.

If the range is known, the process proceeds to a step S48.

If the range is not known, the reader sets the floor of the range to zero and the ceiling of the range to a maximum value which may be processed by processing circuitry 22 and the process proceeds to step S48. Other schemes may be used to determine or estimate the range.

At step S48, the reader determines whether group identification information in the form of a number (M) of possible devices 14 of the respective group is known.

If the number of devices is known, the process proceeds to step S52.

If unknown, the process proceeds to step S50 wherein a binary search may be performed to locate the floor identifier and the ceiling identifier of active devices 14. For example, the method of FIG. 3 may be tailored to identify the active devices 14 present within communications range 16 having the lowest and the highest identifiers. M may be calculated and set equal to the difference of the highest identifier for an active device 14 minus the lowest identifier for an active device 14 and the process proceeds to step S52. Other schemes may be used to determine or estimate the range.

At step S52, the reader utilizes the determined range (N) and number of active devices (M) to calculate $M > N(LOG_2(N))$.

If step S52 is negative, the reader proceeds to step S54 to utilize a binary searching procedure, such as the procedure discussed above with respect to FIG. 3, to identify active devices 14 within range 16.

If step S52 is affirmative, the reader proceeds to step S56 to utilize a walk-through searching procedure, such as the procedure discussed above with respect to FIG. 4, to identify active devices 14 within range 16.

According to one embodiment, reader 12 is configured to determine identification information (e.g., unique identification numbers) of individual active devices 14 located within communications range 16 at different moments in time. As described above, some group information regarding a group of possible remote communications devices (e.g., range of possible devices, number of possible devices) is known or accessible. In other embodiments, some or all identification information may be derived or approximated as described above in FIG. 5. Group identification information for a group of devices 14 may be provided or determined while identities of at least some devices 14 within communications range 16 may not be known at a given moment in time.

Reader 12 may identify active remote communications devices 14 within communications range 16 for inventorying operations. Furthermore, reader 12 may direct respective communications (e.g., including data) to individual desired ones of devices 14 following identification of devices 14.

At least some aspects of the disclosure provide efficient search methods and structure for identifying a plurality of remote communications devices 14 which may be within a communications range 16 of a reader 12. An entire range of identification numbers may be searched quickly and efficiently for the existence of active devices 14 by selecting an appropriate one of a plurality of different search procedures in at least one embodiment.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A communications device identification method comprising: providing identification information regarding a group of wireless identification devices within a wireless communications range of a reader; using the provided identification information, selecting one of a plurality of different search procedures for identifying unidentified ones of the wireless identification devices within the wireless communications range; and identifying at least some of the unidentified ones of the wireless identification devices using the selected one of the search procedures; and wherein the search procedures individually include a plurality of steps which are performed for identifying the unidentified one of the wireless identification devices within the wireless communications range of the reader, wherein the steps of the selected one of the search procedures are different than the steps of a non-selected one of the search procedures.

2. The method of claim 1 wherein the providing the identification information comprises determining a range of identifiers of the wireless identification devices which may be within the wireless communications range.

3. The method of claim 2 wherein the providing the identification information comprises determining a number of wireless identification devices which may be within the wireless communications range.

4. The method of claim 3 wherein the determining the number comprises calculating a difference between wireless communications devices having minimum and maximum identifiers.

5. The method of claim 4 wherein the determining the number comprises determining using a binary search to identify the wireless communications devices having the minimum and maximum identifiers.

6. The method of claim 3 wherein the determined range and number correspond to respective ones of N and M, and the selecting comprises selecting a first search procedure if $M<N/LOG_2(N)$ and selecting a second search procedure if $M>N/LOG_2(N)$.

7. The method of claim 6 wherein the first search procedure comprises a binary search procedure and the second search procedure comprises a walk-through search procedure.

8. The method of claim 1 further comprising communicating data intermediate identified ones of the wireless identification devices and the reader.

9. The method of claim 8 wherein the communicating from at least one of the wireless identification devices to the reader comprises communicating using backscatter modulation.

10. The method of claim 1 wherein the reader and the wireless identification devices are configured to implement radio frequency identification device (RFID) communications.

11. The method of claim 1 wherein the plurality of different search procedures individually comprise a search procedure for identifying the at least some of the unidentified ones of the wireless identification devices within an entirety of the same wireless communications range of the reader.

12. The method of claim 1 wherein each of the search procedures is configured to provide unique identifications which completely identify the unidentified ones of the wireless identification device.

13. The method of claim 1 wherein the providing comprises providing the identification information prior to any communications of the reader with the wireless identification devices.

14. The method of claim 1, wherein the search procedures are individually configured to enable identification of a plurality of the unidentified ones of the wireless identification devices during a single execution of the respective individual search procedure.

15. The method of claim 1 wherein one of the steps of the selected one of the search procedures is not present in a non-selected one of the search procedures.

16. The method of claim 1 wherein the identifying comprises identifying all of the wireless identification devices within the wireless communications range of the reader using the selected one of the search procedures.

17. A communications device identification method comprising: identifying a first of a plurality of wireless identification devices within a wireless communications range of a reader configured to communicate with the wireless identification devices; identifying a second of the wireless identification devices within the wireless communications range of the reader; selecting one of a plurality of different search procedures using the identifications of the first and the second of the wireless identification devices; and identifying at least one unidentified wireless identification device within the wireless communications range using the selected one of the search procedures; and wherein the search procedures individually include a plurality of steps which are performed to identify the wireless identification devices within the wireless communications range of the reader, wherein the steps of the selected one of the search procedures are different than the steps of a non-selected one of the search procedures.

18. The method of claim 17 wherein the first and the second of the wireless identification devices comprise wireless identification devices having respective ones of a minimum identifier and a maximum identifier.

19. The method of claim 17 further comprising communicating with at least one of the identified wireless identification devices using the reader after the identifying.

20. The method of claim 17 wherein one of the search procedures comprises a binary search procedure, and an other of the search procedures comprises a walk-through search procedure.

21. The method of claim 17 wherein the plurality of different search procedures individually comprise a search procedure for identifying the at least one unidentified wireless identification device within an entirety of the same wireless communications range of the reader.

22. The method of claim 17 wherein the search procedures are configured to be implemented independent of one another.

23. The method of claim 17 wherein the identifying comprises identifying all of the wireless identification devices within the wireless communications range of the reader using the selected one of the search procedures.

24. A communications device identification method comprising:
providing information regarding a range of identifiers of wireless communications devices which may be within a wireless communications range of a reader;
providing information regarding a number of wireless communications devices which may be within the wireless communications range;
selecting a binary search procedure if $M<N/LOG_2(N)$, wherein M is the range of the identifiers of the wireless communications devices and N is the number of wireless communications devices; and
selecting a walk-through search procedure if $M>N/LOG_2(N)$.

25. A communications method comprising:
providing a first group of wireless identification devices within a wireless communications range of a reader at a first moment in time;

providing first identification information regarding the first group;

first selecting one of a plurality of different search procedures for identifying the wireless identification devices of the first group, wherein the first selecting comprises selecting using the first identification information;

identifying unidentified ones of the wireless identification devices of the first group using the selected one of the search procedures;

providing a second group of wireless identification devices within the wireless communications range of the reader at a second moment in time;

providing second identification information regarding the second group;

second selecting an other of the different search procedures using the second identification information; and identifying unidentified ones of the wireless identification devices of the second group using the selected other of the search procedures.

26. The method of claim 25 further comprising communicating data intermediate the reader and identified ones of the wireless identification devices of the first and the second groups.

27. The method of claim 25 wherein the first selecting comprises selecting prior to any searching of the wireless identification devices of the first group and the second selecting comprises selecting prior to any searching of the wireless identification devices of the second group.

28. A wireless communications reader comprising: an antenna configured to communicate wireless signals within a wireless communications range; processing circuitry coupled with the antenna and configured to implement wireless communications with a plurality of wireless identification devices within the wireless communications range via the antenna, to analyze a number of wireless identification devices which may be present within the wireless communications range with respect to a range of identifiers of wireless identification devices which may be present within the wireless communications range, to select one of a plurality of search procedures using the analysis, and to identify at least one of the wireless identification devices within the wireless communications range using the selected search procedure; and wherein the search procedures individually comprise a plurality of steps which are performed by the processing circuitry to identify the wireless identification devices within the wireless communications range of the reader, and wherein the steps of the selected search procedure are different than the steps of a non-selected search procedure.

29. The reader of claim 28 wherein the processing circuitry is configured to estimate the number of the wireless identification devices.

30. The reader of claim 29 wherein the processing circuitry is configured to identify minimum and maximum ones of the wireless identification devices and to calculate a difference between the minimum and maximum ones of the wireless identification devices to estimate the number.

31. The reader of claim 28 wherein the processing circuitry is configured to estimate the range of identifiers of the wireless identification devices.

32. The reader of claim 31 wherein the processing circuitry is configured to estimate the range corresponding to minimum and maximum possible values associated with the processing circuitry.

33. The reader of claim 28 wherein the range of the identifiers of the identification devices and the number of the wireless identification devices correspond to respective ones of N and M, and wherein the processing circuitry is configured to select a first of the search procedures if $M<N/LOG_2(N)$ and to select a second of the search procedures if $M>N/LOG_2(N)$.

34. The reader of claim 33 wherein the first search procedure comprises a binary search and the second search procedure comprises a walk-through search procedure.

35. The reader of claim 28 wherein the processing circuitry is configured to process backscatter modulation communications received from at least one of the wireless identification devices.

36. The reader of claim 28 wherein the processing circuitry is configured to implement radio frequency identification device (RFID) communications using the antenna.

37. The reader of claim 28 wherein the plurality of search procedures individually comprise a search procedure usable to identify the at least one wireless identification device within an entirety of the same wireless communications range.

38. The reader of claim 28 wherein each of the search procedures is configured to provide unique identifications which completely identify the wireless identification devices.

39. The reader of claim 28 wherein the processing circuitry is configured to analyze the number of wireless identification devices prior to any communications of the reader with the wireless identification devices.

40. The reader of claim 28 wherein the processing circuitry is configured to identify all of the wireless identification devices within the wireless communications range using the selected search procedure.

41. A wireless communications system comprising:
a wireless communications reader configured to implement wireless communications within a wireless communications range;
a first group of wireless identification devices located within the wireless communications range at a first moment in time;
a second group of wireless identification devices located within the wireless communications range at a second moment in time;
wherein the wireless communications reader is configured to obtain the identity of at least one of the wireless identification devices of the first group using a first search procedure and to obtain the identity of at least one of the wireless identification devices of the second group using a second search procedure different than the first search procedure; and
wherein the wireless communications reader is configured to select the first and the second search procedures using an analysis of group identification information of respective ones of the first group and the second group.

42. The system of claim 41 wherein the wireless communications reader and identified ones of the wireless identification devices are configured to exchange wireless communications.

43. The system of claim 41 wherein the first search procedure comprises a binary search procedure and the second search procedure comprises a walk-through search procedure.

44. An article of manufacture comprising: at least one computer-readable storage medium comprising executable instructions stored thereon that are configured to cause processing circuitry of a wireless communications reader to: access information regarding a plurality of wireless identification devices which may be within a wireless communications range of the wireless communications reader; select one of a plurality of different search procedures using the accessed information, wherein the different search procedures comprise procedures for identifying unidentified ones of the wireless identification devices; and identify unidentified ones of the wireless identification devices using the selected one of the search procedures; and wherein the search procedures individually comprise a plurality of steps which are performed by the processing circuitry for identifying unidentified ones of the wireless identification devices within the wireless communications range of the reader, and wherein the steps of the selected one of the search procedures are different than the steps of a non-selected one of the search procedures.

45. The article of claim 44 wherein the executable instructions are configured to cause the processing circuitry to access the information comprising a range of identifiers of the wireless identification devices and a number of the wireless identification devices.

46. The article of claim 44 wherein the executable instructions are configured to cause the processing circuitry to implement wireless communications with at least one of the identified wireless identification devices.

47. The article of claim 44 wherein each of the search procedures is configured to be executed by the processing circuitry independent of others of the search procedures to provide unique identifications which completely identify the unidentified ones of the wireless identification devices.

48. The article of claim 44, wherein the search procedures are individually configured to enable identification of a plurality of the unidentified ones of the wireless identification devices during a single execution of the respective individual search procedure.

49. The article of claim 44 wherein the search procedures are individually configured to cause the processing circuitry to identify the presence of all of the wireless identification devices which are present within the communications range of the reader.

* * * * *